United States Patent
Carlson et al.

(10) Patent No.: US 9,805,270 B2
(45) Date of Patent: *Oct. 31, 2017

(54) VIDEO SEGMENTATION TECHNIQUES

(71) Applicant: Amazon Technologies, Inc., Reno, NV (US)

(72) Inventors: Adam Carlson, Seattle, WA (US); Douglas Ryan Gray, Redwood City, CA (US); Ashutosh Vishwas Kulkarni, Bellevue, WA (US); Colin Jon Taylor, Orinda, CA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/255,978

(22) Filed: Sep. 2, 2016

(65) Prior Publication Data

US 2017/0083770 A1    Mar. 23, 2017

Related U.S. Application Data

(63) Continuation of application No. 14/577,277, filed on Dec. 19, 2014, now Pat. No. 9,436,876.

(51) Int. Cl.
  *G06K 9/00* (2006.01)
  *G06K 9/62* (2006.01)
  *G06K 9/46* (2006.01)

(52) U.S. Cl.
  CPC ..... *G06K 9/00765* (2013.01); *G06K 9/00147* (2013.01); *G06K 9/00744* (2013.01); *G06K 9/46* (2013.01); *G06K 9/469* (2013.01); *G06K 9/6212* (2013.01); *G06K 9/6224* (2013.01); *G06T 2207/10016* (2013.01)

(58) Field of Classification Search
  CPC .... G06K 9/0047; G06K 9/00765; G06K 9/46; G06K 9/469; G06K 9/6224; G06T 2207/10016; G06T 5/40; G06T 7/11; G06T 7/12
  USPC ....................................................... 382/168
  See application file for complete search history.

(56) References Cited

U.S. PATENT DOCUMENTS

| | | | |
|---|---|---|---|
| 7,016,540 B1 * | 3/2006 | Gong | G06F 17/30802 348/700 |
| 9,514,536 B2 * | 12/2016 | Rafati | G06T 7/0028 |
| 2009/0083790 A1 * | 3/2009 | Wang | G11B 27/28 725/38 |

(Continued)

*Primary Examiner* — Kanjibhai Patel
(74) *Attorney, Agent, or Firm* — Hogan Lovells US LLP

(57) ABSTRACT

A video segmentation system can be utilized to automate segmentation of digital video content. Features corresponding to visual, audio, and/or textual content of the video can be extracted from frames of the video. The extracted features of adjacent frames are compared according to a similarity measure to determine boundaries of a first set of shots or video segments distinguished by abrupt transitions. The first set of shots is analyzed according to certain heuristics to recognize a second set of shots distinguished by gradual transitions. Key frames can be extracted from the first and second set of shots, and the key frames can be used by the video segmentation system to group the first and second set of shots by scene. Additional processing can be performed to associate metadata, such as names of actors or titles of songs, with the detected scenes.

20 Claims, 8 Drawing Sheets

(56) References Cited

U.S. PATENT DOCUMENTS

2010/0092037 A1* 4/2010 Peleg .................. G06F 17/3079
  382/103

* cited by examiner

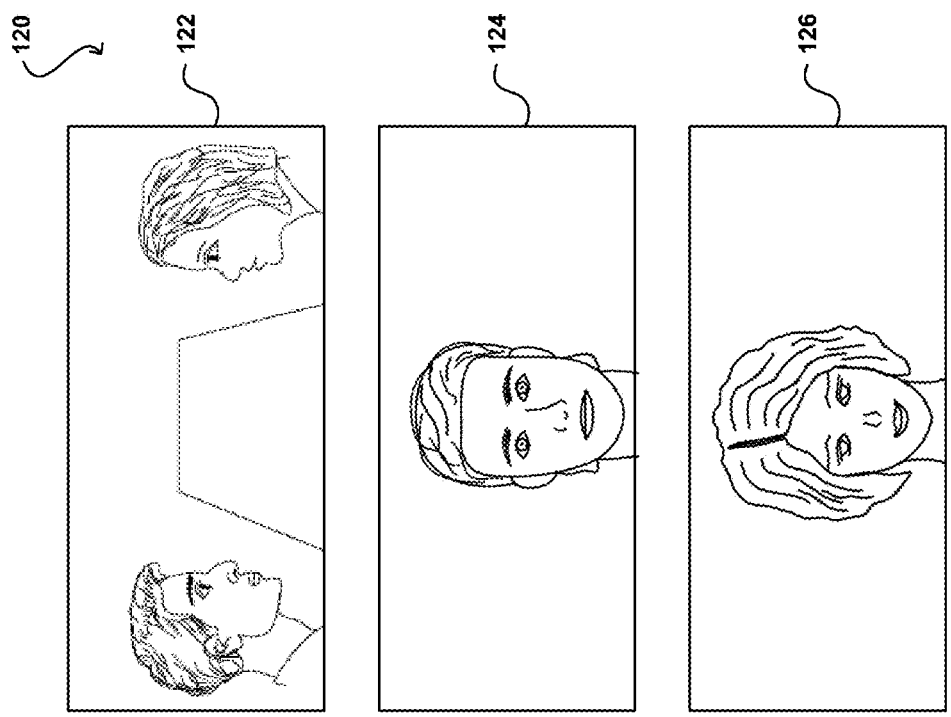
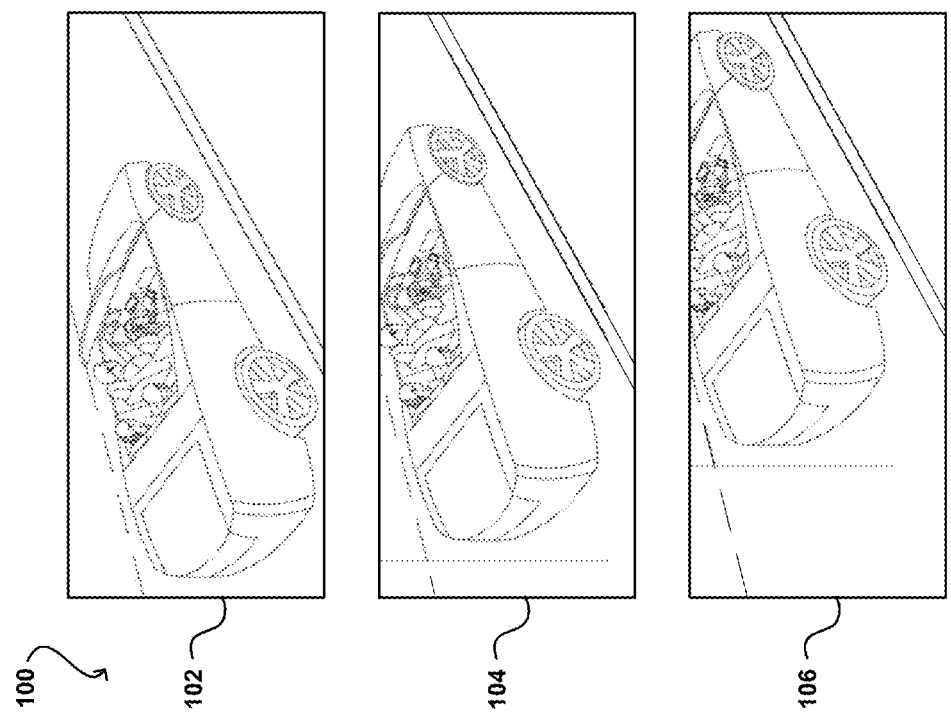
FIG. 1A
FIG. 1B

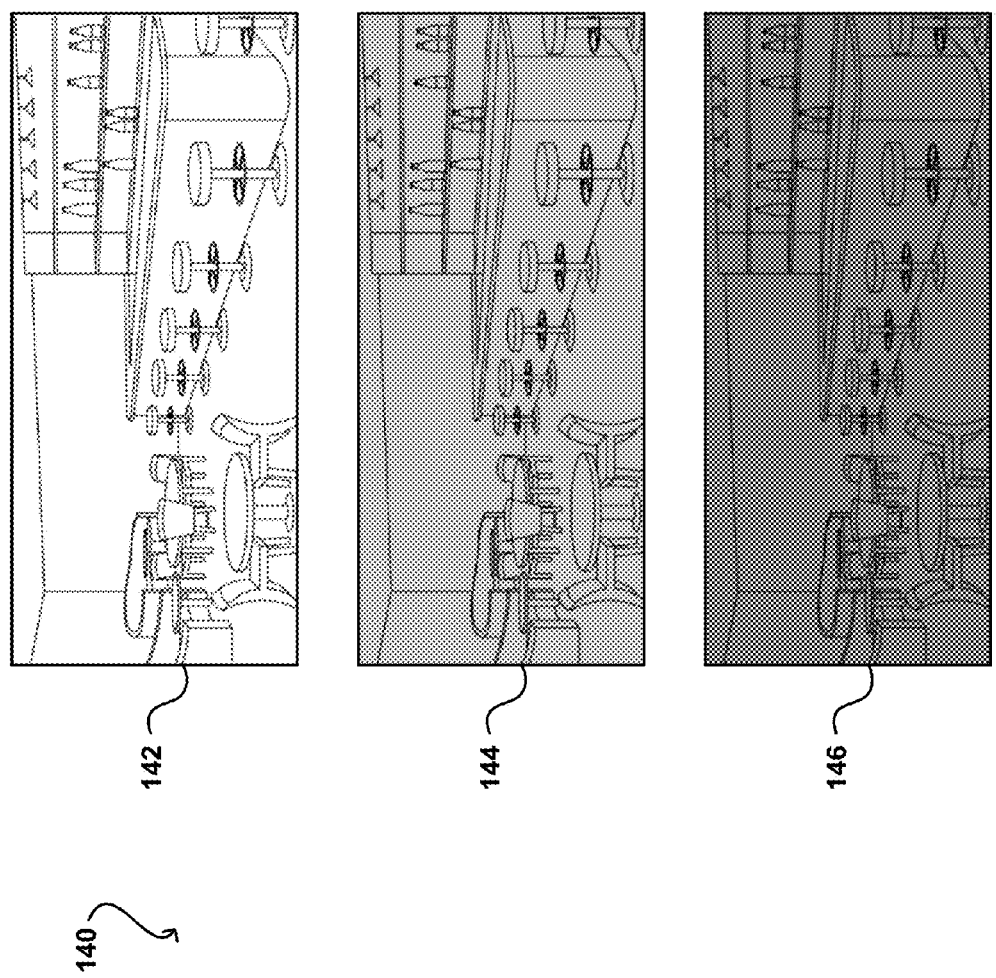

VIDEO SEGMENTATION TECHNIQUES

CROSS REFERENCE TO RELATED APPLICATIONS

This application is a continuation of allowed U.S. application Ser. No. 14/577,277 entitled "VIDEO SEGMENTATION TECHNIQUES," filed Dec. 19, 2014, which is incorporated herein by reference for all purposes.

BACKGROUND

As computing devices become progressively sophisticated and the Internet is readily accessible to more and more users, the creation, editing, and consumption of digital video has proliferated. Applications such as video-on-demand, video-sharing, digital video broadcasting, massive open online courses (MOOCs) or distance education, among other uses of digital video, are increasingly popular and have created a need to efficiently describe, organize, and manage video data. A conventional approach is to manually segment a video to generate an index or description of the content of the video. However, such an approach is time-intensive and prohibitively costly. Further, manual video segmentation is highly subjective because it requires a person to make his own judgments on how to index the video. In addition, when a digital video has been manually indexed, the video segmentation can be inconsistent, inaccurate, and/or incomplete.

BRIEF DESCRIPTION OF THE DRAWINGS

Various embodiments in accordance with the present disclosure will be described with reference to the drawings, in which:

FIGS. 1A, 1B, and 1C illustrate various examples of video segments that can be used in accordance with various embodiments;

DETAILED DESCRIPTION

Figure 2:
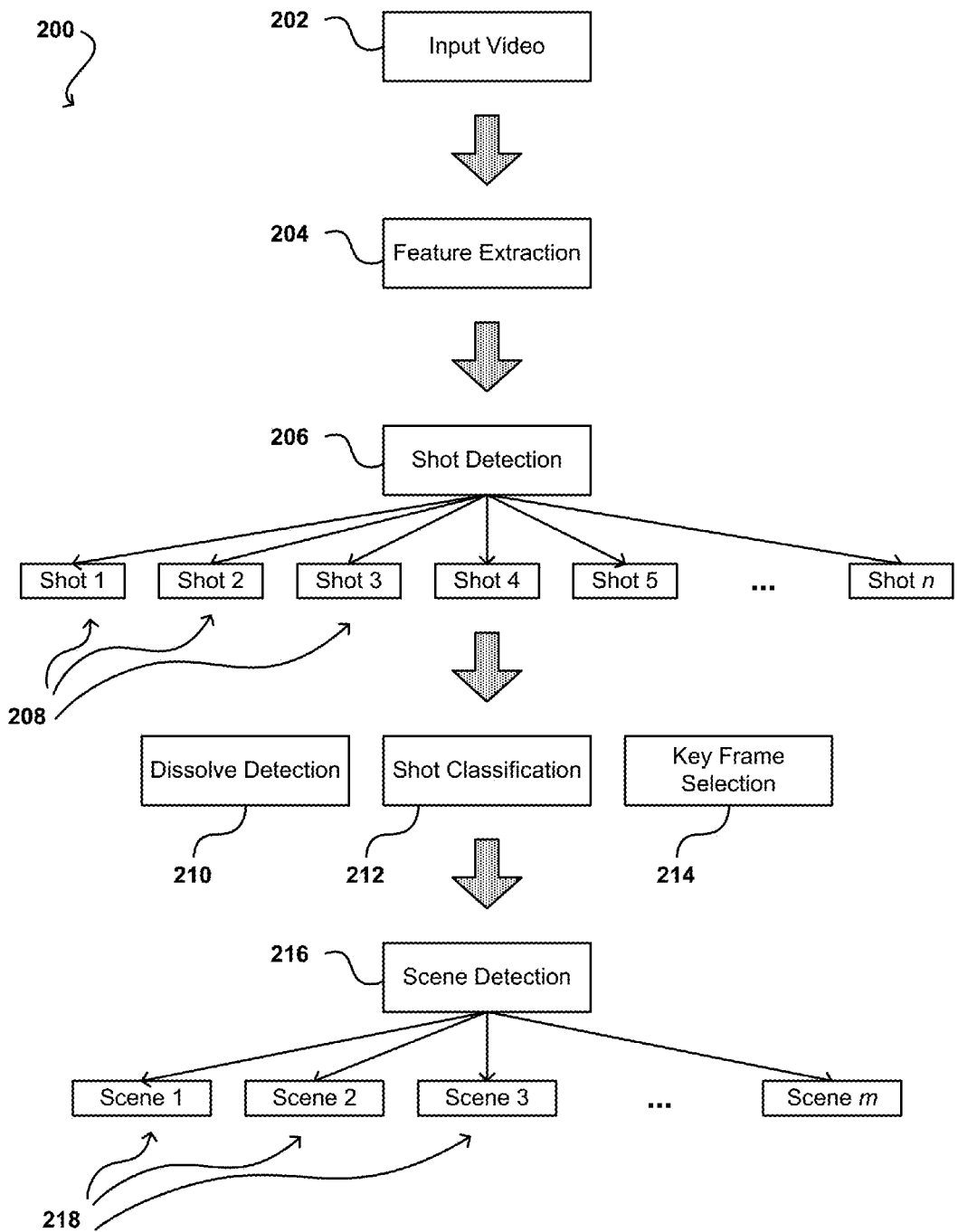
FIG. 2 illustrates a flow diagram for an example approach for video segmentation that can be used in accordance with an embodiment.

Systems and methods in accordance with various embodiments of the present disclosure may overcome one or more of the aforementioned and other deficiencies experienced in conventional approaches for video segmentation. In particular, various embodiments provide for automated segmentation of a digital video by scene. In various embodiments, features of a digital video, including visual, audio, and/or textual characteristics of the video, can be extracted from frames of the video. The extracted features of adjacent frames are compared according to a similarity metric to detect a first set of shots or video segments bounded by abrupt transitions or hard cuts. The first set of shots is further analyzed to detect a second set of shots bounded by gradual transitions or soft cuts. In some embodiments, key frames can be extracted from the first and second set of shots. The extracted key frames can be used to group the first and second set of shots by scene. In an embodiment, a graph representation of the video is generated with the extracted key frames as nodes of the graph representation and a cost function, based at least in part on time and visual, audio, and/or textual similarity, as edges of the graph representation. A minimum cut algorithm is utilized to segment the graph representation to detect the scenes of the video.

In some embodiments, additional processing can be performed to associate useful and interesting metadata with one or more of the detected scenes. For example, face detection can be used to determine whether a face appears in a detected scene and facial recognition can be used to identify the detected face, such as an actor or actress within the detected scene. The scene can be annotated or otherwise associated with the actor or actress, and users can search by the actor or actress's name to navigate to the detected scene. Further, the metadata may enable users to navigate to a website or web application, such as IMDb.com®, to learn more about the actor or actress. As another example, music recognition software can be used to identify the title of a song or other music playing in a scene when it is determined that the scene includes music. In addition to associating the song or music with the scene, the metadata can also enable a user to purchase the song or music. As yet another example, a scene can be annotated with textual data corresponding to the scene. For example, an object detection or text recognition service can be used to detect objects and/or text in the scene to determine a location corresponding to the scene. The scene can be annotated with information about the objects and/or location. In addition, speech-to-text translation, closed captioning, subtitles, and other textual data can be associated with the scene to enable users to search videos by keywords corresponding to the textual data.

Various other functions and advantages are described and suggested below as may be provided in accordance with the various embodiments.

Video segmentation generally involves the partitioning of a video into its constituent parts, such as scenes, shots, and frames. In various embodiments, a video can be segmented by scene. A scene comprises a series of consecutive shots grouped together because, for example, they are captured in the same location or they share thematic content. Scenes are analogous to chapters of a book. A shot can be a sequence of frames recorded contiguously and representing a continuous action in time or space. A shot can also be an unbroken sequence of frames captured by a single camera. Shots are analogous to paragraphs of the book. A frame is a single still image of a video. For example, a 90 minute film shot at 24 frames per second will contain 1,296,000 frames. Frames are analogous to sentences of the book while regions within a frame are analogous to words of the book.

Video segmentation by scene typically requires detecting transitions between shots. There are generally two types of transitions between shots, (i) abrupt transitions or hard cuts and (ii) gradual transitions or soft cuts. An abrupt transition or hard cut generally occurs in a single frame when stopping and restarting the camera or switching to a different camera. Gradual transitions or soft cuts are created by combining two shots, such as by a dissolve, fade, or wipe. A dissolve involves a first shot super-imposed on a second shot as frames of the first shot decrease in brightness and frames of the second shot increase in brightness. A fade is a particular type of dissolve that involves super-imposition of a black image and a shot. In particular, a fade-in is a gradual increase in brightness beginning from a black frame and a fade-out is a slow decrease in brightness concluding with a black frame. A wipe is a set of shot change techniques in which the appearing and disappearing shots coexist in different regions (e.g., top, bottom, left, or right of the frame) of the intermediate frames, and the region occupied by the appearing shot grows until it replaces the disappearing shot entirely.

FIGS. 1A, 1B, and 1C illustrate examples of video segments 100, 120, and 140. In the example of FIG. 1A, the video segment 100 comprises frames 102, 104, and 106. It will be appreciated that there additional frames between frames 102 and 104 and 104 and 106 but only frames 102, 104, and 106 are provided for illustrative purposes. In this example, a stationary camera (not shown) is utilized to capture video of a moving car when the car is centered within the field of view of the camera, as seen in frame 102, and as the car moves outside the center of the field of view of the camera, as seen in frames 104 and 106. Video segment 100 follows a pattern of $A_1 \rightarrow A_2 \rightarrow A_3$, where A represents segment 100 being captured by a single camera and the subscripts 1, 2, and 3 indicate that there are only minor variation between frames of the segment. Segment 100 thus represents a single shot because it a contiguous sequence of frames comprising visually similar subject matter. Although the example of FIG. 1A uses a stationary camera to capture a shot, it should be understood that a moving camera can also be used for obtaining a video shot. For example, a shot could be filmed by a camera following the moving car and keeping the car in the center of the field of view of the camera.

FIG. 1B illustrates a video segment 120 including frames 122, 124, and 126. Again, it should be understood that there are additional frames between frames 122 and 124 and 124 and 126. In this example, video segment 120 illustrates a scene captured by multiple cameras. The scene comprises a couple talking at a restaurant with a first camera capturing a profile view of both the man and the woman, as shown in frame 122; a second camera capturing a front view of the man as he speaks, as depicted in frame 124; and a third camera capturing a front view of the woman as she speaks, as illustrated in frame 126. Video segment 120 can be represented as pattern $A \rightarrow B \rightarrow C$, where A corresponds to frames captured by the first camera, B corresponds to frames captured by the second camera, and C corresponds to frames captured by the third camera. Each of A, B, and C represent different shots because different cameras (or one camera located at different locations and capturing multiple takes) are used to capture the different perspectives of the man and woman.

FIG. 1C illustrates a video segment 140 including frames, 142, 144, and 146. As with the example segments 100 and 120, there are additional frames between 142 and 144 and 144 and 146. Video segment 140 is an example of a dissolve shot, and specifically, a fade out of a bar scene. Video segment 140 follows the pattern $A_1 \rightarrow A_1 B_n \rightarrow B_{n-1} A_2 \rightarrow \ldots \rightarrow A_{n-1} B_2 \rightarrow B_1$. That is, segment 140 begins with frames corresponding to camera A, each successive frame of the segment is a combination of frames corresponding to A and B, and the sequence concludes with frames corresponding to B. The gradual transition from A to B makes dissolve shots difficult to detect using conventional approaches. Whereas similarity metrics can readily detect abrupt transitions or hard cuts between frames, as in the example of scene 120 of FIG. 1A, those similarity metrics perform poorly or fail to detect altogether gradual transitions or soft cuts in the case of dissolve, fade, and wipe shots.

Systems and approaches in accordance with various embodiments enable more precise segmentation of videos, particularly with respect to gradual transitions or soft cuts. FIG. 2 illustrates a flow diagram 200 for an example approach for video segmentation that can be used in accordance with an embodiment. It should be understood that, for any system discussed herein, there can be additional, fewer, or alternative components performing similar functionality or functionality in alternative orders, or in parallel, within the scope of the various embodiments unless otherwise stated. In this example, an input video 202 is provided to a feature extraction module 204 (or software application, service, or other element located within at least one working memory device of a system having a processor) for capturing features of the input video 202. Features characterize the content of the video, and can be extracted from the visual content, audio, text (e.g., speech-to-text translation, closed captioning, subtitles, screenplay or script, etc.), metadata, or other data corresponding to the video. Visual features utilized for video segmentation include luminance (e.g., average grayscale luminance or the luminance channel in a color model such as hue-saturation-luminance (HSL)); color histograms; image edges; texture-based features (e.g., Tamura features, simultaneous autoregressive models, orientation features, co-occurrence matrices); features of objects in the video (e.g., faces or color, texture, and/or size of detected objects); transform coefficients (e.g., Discrete Fourier Transform, Discrete Cosine Transform, wavelet); and motion; among others. The size of the region from which features are extracted can also vary. For example, features can be extracted on a pixel-by-pixel basis, at a rectangular block level, according to various shaped regions, or by a whole frame, among other approaches.

Audio features are generally used to classify audio segments into speech, non-speech, music, or environmental sound. Audio features include zero-crossing rate or short-time energy, which can be used to distinguish between speech and music; spectrum flux, which can be used to distinguish among speech, non-speech or music, and environmental sound; band periodicity and noise frame ratio, which can be used to distinguish between music and environmental sound; and linear spectral pairs, which can be used to distinguish between speech and music or specific speakers. In some embodiments, visual-based features and audio features can be combined for video segmentation. For example, audio features can be used to detect audio scene changes and visual-based features can be used to detect visual scene changes. A nearest neighbor algorithm can be applied to identify audio breaks and visual breaks that are temporally close to each other. As another example, audio features can be used as a post-processing step for graph-based segmentation techniques. If one speaker can be identified in two connected nodes, these nodes are merged. As yet another example, a visual graph can be generated from visual-based features and an audio-based graph can be constructed from audio features. The audio stream can be segmented according to speaker changes and background conditions. Both graphs can then be merged to detect scenes.

Text features include speech-to-text translation, closed captioning, subtitles, screenplays associated with a video, among others. In some embodiments, text features can be combined with visual-based features for detecting scenes. For example, speech translated to text, a screenplay, closed captioning, or subtitles can be parsed to segment a movie into a hierarchy of shots and scenes. These results can be used to validate visual-based segmentation or the results of visual-based segmentation can be verified using the text-based segmentation.

Once features of the video have been extracted, those features are analyzed to determine boundaries of shots 208 by a shot detection module 206. Various similarity metrics can be utilized by a shot detection module, such as the L-norm cosine similarity, the Euclidean distance, the histogram intersection, the chi-squared similarity, the earth mover's distance, among others. In an embodiment, respective feature vectors of a pair of adjacent frames are compared using cosine similarity. When the respective feature vectors are L2 normalized, the cosine similarity is simply a dot product of the two vectors.

In an embodiment, shot detection module 206 performs a first pass to partition the video according to abrupt transitions or hard cuts identified in the video. A second pass is then performed by a dissolve detection module 210 to refine the results of the first pass by identifying gradual transitions or soft cuts. Approaches for implementing a dissolve detection module are discussed elsewhere herein. Various approaches can be implemented to determine the first set of shots, including threshold-based and statistical learning-based techniques. Threshold-based approaches detect shot boundaries by comparing the measured pair-wise similarities between frames according to a threshold. When a similarity metric is less than the threshold, a boundary is detected. The threshold can be global or adaptive. Global threshold-based algorithms use the same threshold, which is generally set empirically, over the entire video. Adaptive threshold-based algorithms compute the threshold locally within a sliding window.

Statistical learning-based approaches treat shot boundary detection as a classification task in which frames can be classified as a shot change or no shot change. Examples of statistical learning-based approaches include support vector machines (SVMs), boosting algorithms, decision trees, neural networks, among others. An SVM is generally a binary classifier. Given labeled training data comprising instances of a first class or a second class, an SVM training algorithm builds a model capable of assigning new instances to one of the first class or the second class by finding an optimal hyperplane, i.e., a hyperplane that separates the training data between the two classes and maximizes the gap or "margin" between instances of the two classes. When a linear separator cannot be found, the training data can be projected to a higher-dimensional space using kernel techniques where the training data effectively becomes linearly separable. Finding the hyperplane can be formulated as a quadratic optimization problem that can be solved by known techniques. An SVM can be used as a two-class classifier to separate hard cuts from non-cuts. An SVM can also be combined with other approaches. For example, candidate shot boundaries can be detected using a threshold-based method, and an SVM classifier can be used to verify the shot boundaries (or vice versa).

Boosting algorithms are based on the premise that a series of "weak" classifiers (e.g., classifiers that may only accurately predict an outcome a little more than half of the time) can be combined to create a "strong" classifier (e.g., a classifier capable of predicting an outcome according to a desired level of accuracy). An example of a boosting algorithm is Adaptive boosting or AdaBoost, which is a machine learning boosting algorithm which finds a highly accurate classifier (i.e., low error rate) from a combination of many "weak" classifiers (i.e., substantial error rate). Given a data set comprising examples that are within a class and not within the class and weights based on the difficulty of classifying an example and a weak set of classifiers, AdaBoost generates and calls a new weak classifier in each of a series of rounds. For each call, the distribution of weights is updated that indicates the importance of examples in the data set for the classification. On each round, the weights of each incorrectly classified example are increased, and the weights of each correctly classified example is decreased so the new classifier focuses on the difficult examples (i.e., those examples have not been correctly classified). AdaBoost can be used to make cut detection a pattern recognition task.

Decision trees are trees that classify instances by sorting them based on feature values. Each node in a decision tree represents a feature in an instance to be classified, each branch represents a possible value of the node, and each leaf node represents a classification or decision. Generally, the feature that best divides the training data would be the root node of the tree, and higher-level nodes will typically divide the training data better than lower-level nodes. Decision trees can be used to classify frames as shot changes or no shot change, where similarities between frames within a particular temporal interval are used as input.

Neural networks are inspired by biological neural networks and consist of an interconnected group of functions or classifiers that process information using a connectionist approach. Neural networks change their structure during training, such as by merging overlapping detections within one network and training an arbitration network to combine the results from different networks. Examples of neural network algorithms that can be used to classify frames as shot changes or no shot change include the multilayer neural network, the autoassociative neural network, the probabilistic decision-based neural network (PDBNN), and the sparse network of winnows (SNoW).

Returning to FIG. 2, once shots have been detected, they can be annotated, designated, or otherwise classified by a shot classification module 212. Shot classification can be utilized by later processing stages to provide hints about the content of a shot to undergo or forego certain processing. For example, if a shot is classified as "blank," then face detection, object detection, speech recognition, music recognition, text recognition and/or other video analyses can be skipped. In an embodiment, classification results are stored as strings having any arbitrary value, such as "blank" for blank shots, "card credit" or "rolling credit" for shots identified as credits of a movie or television show, "dissolve" for shots identified as gradual transitions or soft cuts, "action" for shots including a substantial amount of action, and "static" for shots not including a substantial amount of action.

In some embodiments, one or more key frames are extracted for each detected shot by a key frame selection module 214. Features used for key frame extraction include colors, edges, shapes, optical flow, MPEG-7 motion descriptors (e.g., temporal motion intensity, spatial distribution of motion), MPEG discrete cosine coefficient and motion vectors, among others. Various techniques can be utilized for key frame selection, including sequential comparison-based, global comparison-based, reference frame-based, clustering-based, curve simplification-based, and object-based algorithms. Sequential comparison-based algorithms sequentially compare frames successive to a previously selected key frame to determine whether the successive frame is different to the previously selected key frame by some threshold. Global comparison-based algorithms select key frames according to an objective function, such as distributing key frames equally within a shot or minimizing the sum of correlations between key frames to make key frames as uncorrelated with one another as possible. Reference frame-based algorithms select key frames by generating a reference frame and extracting key frames by comparing the frames in the shot with the reference frame. For example, a reference frame can be generated by determining the average histogram for all of the frames in a shot. Clustering-based algorithms choose key frames by clustering the frames of a shot and selecting the frames closest to the cluster centers as the key frames. Curve simplification-based algorithms extract key frames by mapping each frame of a shot to a point in feature space, linking the points in sequential order to form a trajectory curve, and then identifying the set of points that best represent the shape of the curve. Object-based algorithms select key frames to ensure that the key frames contain specified objects.

The key frames can utilized by a scene detection module 216 to determine the scenes 218 of the input video 202. Various approaches can be used for scene detection, including rule-based methods, graph-based methods, stochastic methods, among others. Rule-based methods apply certain heuristics for segmenting a video into scenes. An example of a rule-based method is to apply a similarity metric to group similar shots within a predefined time interval to segment scenes. Other examples of rule-based methods are based on film-editing rules or film grammar, such as the action matching rule, the film tempo rule, the shot/reverse shot rule, the establishment/breakdown rule, among others. The action matching rule dictates that motion in the same direction in two consecutive shots belong to a same scene. The film tempo rule is based on the premise that the number of shots, sound, and the motion within shots depict the rhythm of a scene, and the rule requires that the rhythm not change within a scene. The shot/reverse shot rule determines that alternating shots belong to a same scene. A typical example is a dialog between two persons. The establishment/breakdown rule defines a scene to include an establishing scene (e.g., the location of a scene where characters and objects and their spatial relations are introduced in an overview shot) and breakdown shots (e.g., close-ups of the characters).

Graph-based methods treat video segmentation as a graph partitioning problem. Graph-based algorithms generally cluster shots based on similarity (and temporal proximity) to generate a graph representation for a video. Nodes of the graph represent shots or clusters of shots and edges indicate similarity and/or temporal proximity between the connected nodes. By applying graph segmentation algorithms, the constructed graphs are divided into sub-graphs, each representing a scene.

Algorithms based on stochastic methods address the boundary detection problem with stochastic models. An optimal solution is approximated by maximizing the a posteriori probability of the estimated scene boundaries.

Although feature extraction module 204, shot detection module 206, dissolve detection module 210, shot classification module 212, key frame selection module 214, and scene detection module 216 are illustrated as separate components in the example of FIG. 2, it will be appreciated each of the modules may comprise a single system or some of the components can be combined. For example, a hard cut detection module, a soft cut detection module, and a shot classification module can be combined into a single shot detection module.

Figure 3:
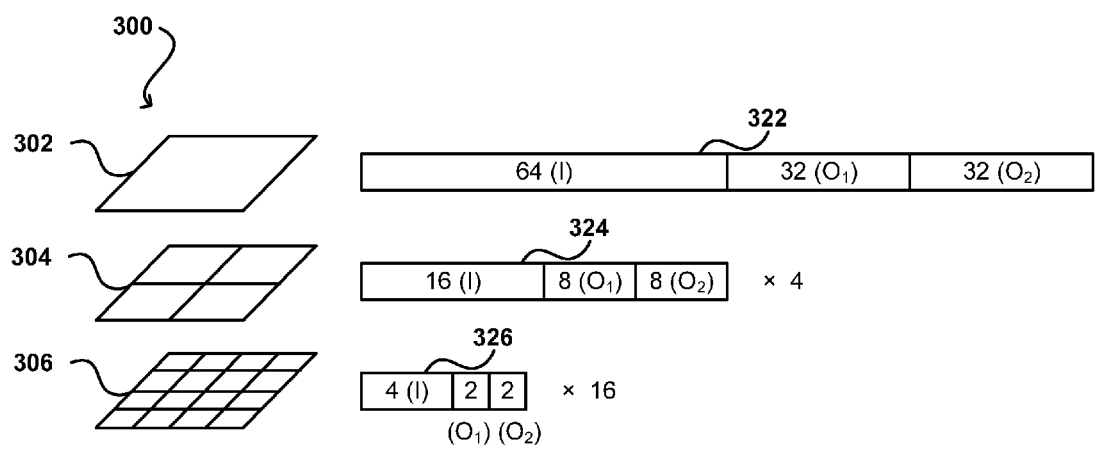
FIG. 3 illustrates an example approach for feature extraction that can be used in accordance with an embodiment.

FIG. 3 illustrates an example approach for extracting features in accordance with an embodiment, such as used by the feature extraction module 206 shown in FIG. 2. In the example of FIG. 3, a frame of video is encoded as a pyramid of histograms 300 comprising a first level histogram 302 over the entire frame, a second level of histograms 304 for each quadrant of the frame, and a third level of histograms 306 for each quarter of each quadrant of the frame. Such an approach captures both global information and local information about the frame. An opponent color model can be used to characterize the color information for the frame:

$$I=(R+G+B)/3$$

$$O_1=(R+G-2B)/4+0.5$$

$$O_2=(R-2G+B)/4+0.5, \quad \text{Equation 1}$$

where I represents the intensity channel and $O_1$ and $O_2$ represent the opponent color channels.

Each level of the pyramid of histograms 300 is encoded in 128 bytes, which is then appended to create the final feature vector (384 bytes in total). At each descending level of the pyramid of histograms, the number of histograms computed increases four-fold. To maintain the 128-byte constraint for each level, the number of bytes used to describe each channel per segment is quartered as the pyramid is descended. As a result, the histograms of two frames at the first level must be substantially similar for the frames to match but there can be some dissimilarity between the histograms of lower levels to account for jitter, noise, motion, and other minor deviations between frames.

Pyramid levels 302, 304, and 306 are encoded as byte representations 322, 324, and 326, respectively. The amount of data used to store the intensity channel I is double the amount for the opponent color channels $O_1$ and $O_2$ because there is generally more useful information in the intensity channel. Each histogram is L1 normalized and each bin is encoded as a single byte.

In addition to providing a compact encoding for a frame of video, computing the pyramid of histograms is also very efficient. Only pixels at the first level are explicitly analyzed and histograms for the other levels can be found by summing the histograms from ascending levels. Further, the transformation from RGB to the opponent color model can be calculated using vector integer operations.

The pyramid of histograms is discussed in Chum, Ondřej et al. "Scalable Near Identical Image and Shot Detection." Proceedings of the 6th ACM International Conference on Image and Video Retrieval, pp. 549-556. ACM, 2007, which is incorporated herein by reference.

Figure 4:
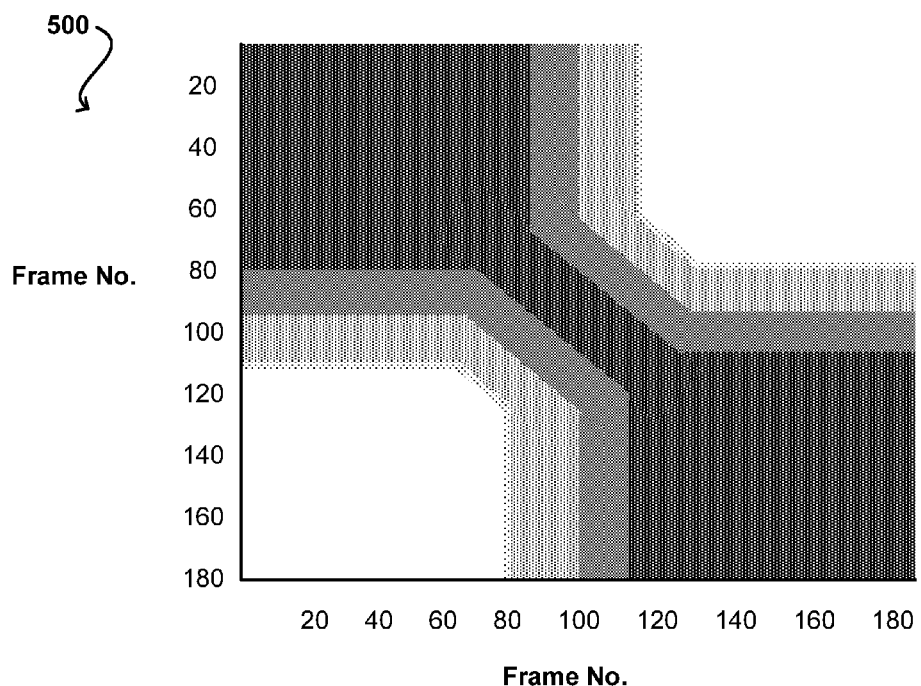
FIG. 4 illustrates an example of a similarity matrix for a segment of video that can be generated in accordance with an embodiment.

FIG. 4 illustrates an example of a similarity matrix 500 that can be generated in accordance with an embodiment, such as by the dissolve detection module 210 discussed in FIG. 2, Time, or frame index, runs along both axes as well as the diagonal of similarity matrix 500. In this example, the similarity matrix 500 corresponds to a dissolve shot. As discussed above, after a first set of shots corresponding to abrupt transitions or hard cuts is detected, a set of rules is used to identify a second set of shots corresponding to gradual transitions or soft cuts. These rules include:

1. Does the shot meet a time threshold? In an embodiment, the time threshold is set to 60 frames (about 2.5 seconds).
2. Do the first set of frames of the shot and the last set of frames of the shot meet a dissimilarity threshold? A dissolve shot comprises two different looking shots. Thus, in an embodiment, the dissimilarity threshold between features from the first and last frames is set to cosine similarity of less than 0.95.

3. Does the similarity matrix of the shot include the pattern, same→gradual change→same? That is, does the similarity matrix of the shot include the pattern corresponding to similarity matrix 500?

In an embodiment, a pattern corresponding to similarity matrix 500 is generated and similarity is computed at every valid time point for a discrete set of possible dissolve lengths. In effect, the pattern is slid along the diagonal of the similarity matrix of the shot to determine whether there is a match. The set of window sizes (in frames) used are 18, 24, 30, 36, 42, 48, 54, and 60. This enables detection of dissolves between 0.75 seconds and 2.5 seconds. The threshold for detecting a dissolve is set to 0.97.

If a shot passes these three tests, the shot is split into three, with the middle shot being classified as a "dissolve" shot, and the first and last shots analyzed recursively to determine whether the first and last shots include additional dissolve shots.

Figure 5:
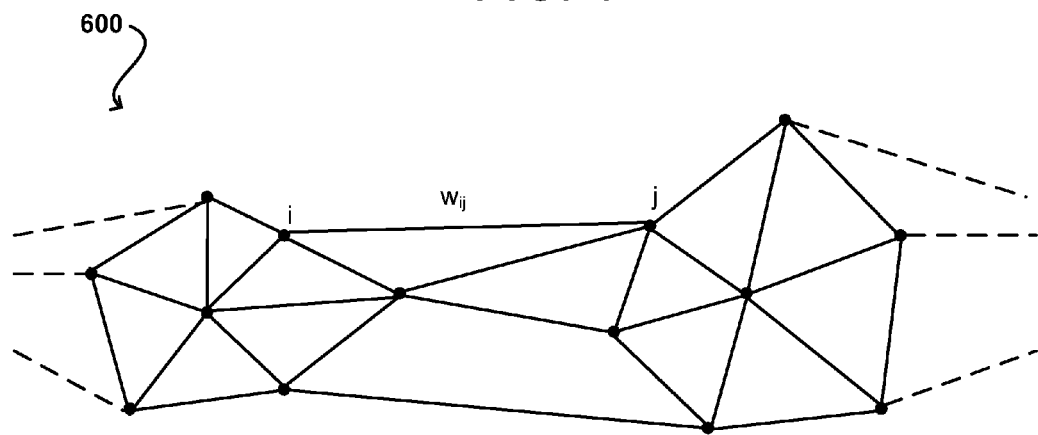
FIG. 5 illustrates an example graph representation for a segment of video that can be used in accordance with an embodiment.

FIG. 5 illustrates an example graph representation 600 for a segment of video in accordance with an embodiment, such as used by the scene detection module 216 described in FIG. 2. In an embodiment, scene detection or scene grouping is treated as a global segmentation problem and solved using dynamic programming on a graph of shot similarity connections. The objective function is based on Shi, Jianbo et al. "Normalized Cuts and Image Segmentation." Pattern Analysis and Machine intelligence, IEEE Transactions on 22, no. 8 (2000): 888-905, which is incorporated herein by reference.

To perform the segmentation, an input video is represented as a set of shots as nodes in a graph, such as graph 600. Each shot/node is connected to every other shot/node successive to that shot/node. If there are N shots, then there are $$\frac{N(N-1)}{2}$$

edges that require a cost computation. In an embodiment, the cost is based on a function of time and visual similarity. The time component is defined as:

$$\exp\left(\frac{-t_{diff}^2}{2\sigma_{time}^2}\right) \qquad \text{Equation 2}$$

where $t_{diff}$ is the time difference in seconds, $\sigma_{time}=54$. The visual similarity component is defined as:

$$\exp\left(\frac{-(\cos(v_i, v_j) - 1)^2}{2\sigma_{visual}}\right) \qquad \text{Equation 3}$$

where $\sigma_{visual}=0.036$.

If a volume of a segment is defined as:

$$vol(A_i) = \sum_{\substack{i \neq j \\ i,j \subset A_i}} w_{ij} \qquad \text{Equation 4}$$

and a cut is defined as:

$$cut(A_i, \overline{A_1}) = \sum_{i \subset A_i, j \subset \overline{A_1}} w_{ij} \qquad \text{Equation 5}$$

then the cost function is defined as:

$$CutCost(A_1, \dots, A_k) = \sum_{i=1}^{k} |A_i|^\alpha + \sum_{i=1}^{k} \frac{cut(A_i, \overline{A_i})}{vol(A_i)} \qquad \text{Equation 6}$$

where the first term has a parameter $\alpha=1.11$ to control how aggressively to cut by adding a non-linear cost to longer scenes, while the second term represents the normalized cut.

As discussed above, some of the shots may be assigned to a class, such as by shot classification module 212 of FIG. 2. Certain classes such as blank shots and dissolve shots are more likely to be scene breaks, so the costs of making those cuts are favorably weighted by multiplying the cost of those shots by a discount factor. In an embodiment, the weights are 0.8 for blank shots and 0.995 for dissolve shots. In an embodiment, there are penalties for long and short shots.

In an embodiment, to optimize scene segmentation, dynamic programming is used to compute the cost of all possible cuts through the graph. The particular implementation used is Dijkstra's algorithm.

Figure 6:
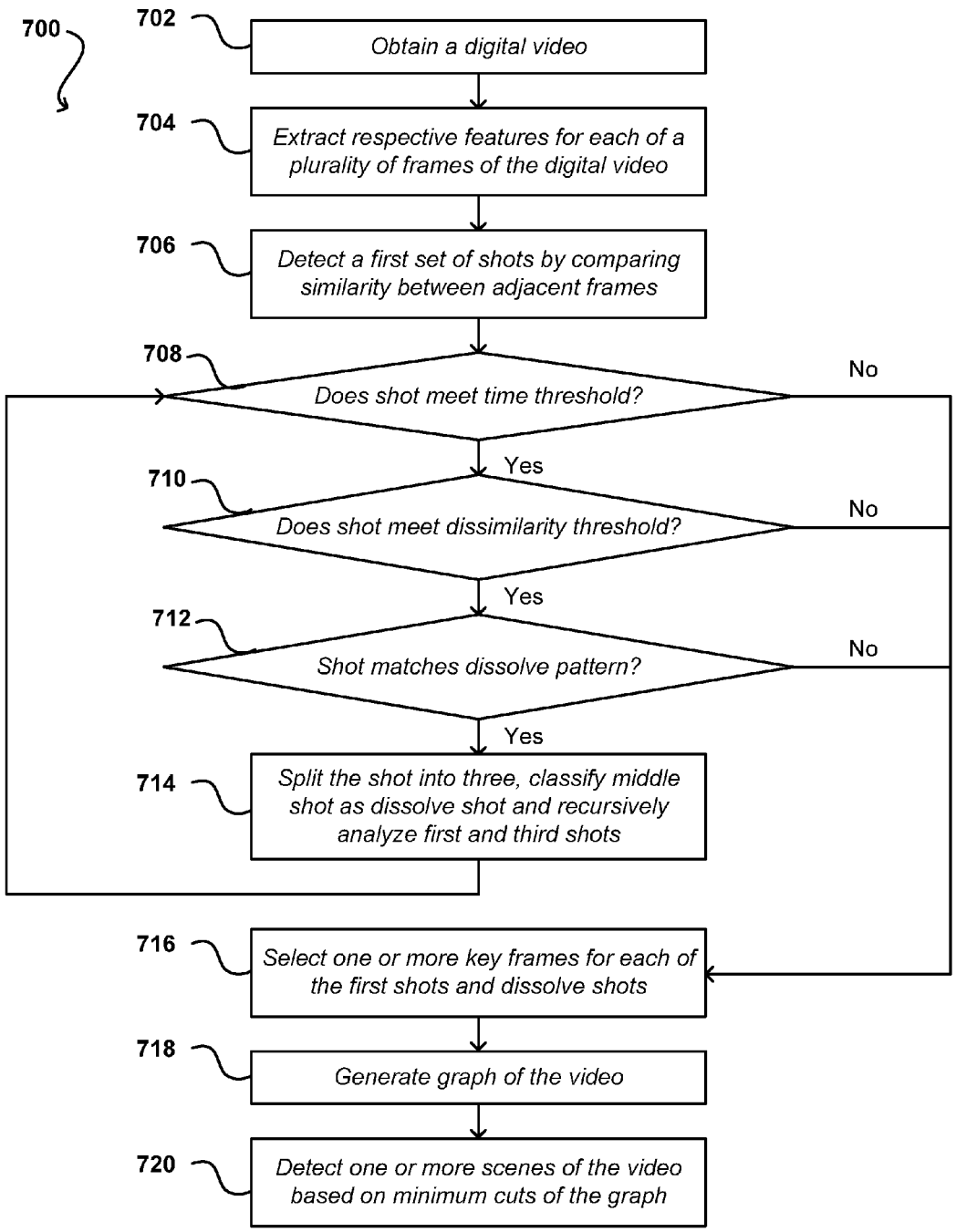
FIG. 6 illustrates an example process for video segmentation that can be used in accordance with an embodiment.

FIG. 6 illustrates an example process 700 for video segmentation that can be used in accordance with an embodiment, such as by the example system 200 of FIG. 2. It should be understood that, for any process discussed herein, there can be additional, fewer, or alternative steps performed in similar or alternative orders, or in parallel, within the scope of the various embodiments unless otherwise stated. The process may begin by obtaining an input digital video 702. The video may be a movie or television show provided by a content provider, such as a film or television studio, digital video broadcaster, or a video-on-demand service, among others; a user-generated video downloaded or streamed from a web-sharing website (or web application) or a distance education provider; or a personal video; among other possibilities. One or more respective features for each frame of the video (or a subset of frames of the video) can be extracted 704. The extracted features include at least one or more visual-based features. In an embodiment, respective pyramids of histograms are calculated for frames of the input video. In some embodiments, the features can also include audio features and/or text features corresponding to the video.

After the features are extracted from the input video, the features of adjacent frames or a window of continuous frames are compared for similarity to determine a first set of shots 706 corresponding to abrupt transitions or hard cuts. In an embodiment, a threshold-based shot detection algorithm is utilized to detect boundaries of the first set of shots. Measured pair-wise similarities between adjacent frames are compared to a predefined threshold. When the similarity metric is less than the threshold, a boundary or hard cut is identified. In an embodiment, any cut point that is within a time window of a previously detected cut point is masked out. In an embodiment, the time window is set to 8 frames.

In some embodiments, the first set of shots are further analyzed to refine shot detection by detecting second shots corresponding to dissolve shots or cut points corresponding to gradual transitions or soft cuts. In an embodiment, each of the first set of shots is first tested to determine whether a shot meets a time threshold 708. In an embodiment, the time threshold is set to 60 frames (about 2.5 seconds). If the shot does not pass the first test, a successive shot is tested until all of the shots of the first set of shots have been tested. If the shot passes the first test, the shot is analyzed to determine whether the first frames of the shot and the last frames of the shot meet a dissimilarity threshold 710. Dissolve shots are characterized by two distinct views between the beginning of a shot and the end of the shot, and the second test ensures visual dissimilarity at the beginning and end of the shot. In an embodiment, the dissimilarity threshold is set to cosine similarity of less than 0.95. If the shot does not pass the second test, a successive shot is tested until all of the shots of the first set of shots have been exhausted. If the shot passes the second test, the shot is evaluated to search for a specified pattern corresponding to a dissolve shot, such as same gradual change same. In an embodiment, a pattern corresponding to the similarity matrix 500 of FIG. 4 is generated and similarity is computed at every valid time point for a discrete set of possible dissolve lengths. The generated pattern is used to slide along the diagonal of the similarity matrix of the shot to determine whether there is a match of the generated pattern and the similarity matrix of the shot. In an embodiment, the set of window sizes (in frames) used are 18, 24, 30, 36 42, 48, 54, and 60 and enables detection of dissolve shots between 0.75 seconds and 2.5 seconds. In an embodiment, the threshold for detecting the dissolve pattern is set to 0.97. If the shot fails the third test, a successive shot is processed until all of the shots of the first set of shots have been tested. If the shot passes the third test, the shot is split into three components with the middle component classified as a dissolve shot and the first and last components analyzed recursively 714 to determine whether there are additional dissolve shots in the first and last components.

Once the first and second set of shots have been detected, one or more respective key frames can be selected for each shot 716. In an embodiment, k-means clustering is used to extract one or more respective key frames from each shot, where k is proportional to the length of the shot.

In some embodiments, an undirected graph representing the input video is created 718, wherein the nodes of the graph correspond to the key frames of the shots and the edges of the graph correspond to a function based on time and visual similarity. In at least some embodiments, the cost function can be further based on audio similarity and/or textual similarity. In an embodiment, the time component of the cost function is defined as what is set forth in Equation 2. In an embodiment, the visual similarity component of the cost function is defined as what is set forth in Equation 3. In an embodiment, if the volume of a segment is defined as what is set forth in Equation 4, and a cut is defined as what is set forth in Equation 5, then the cost function is defined as what is set forth in Equation 6.

As mentioned, at least some of the shots may be classified. Certain classes such as blank shots and dissolve shots are likely to be scene breaks, so the costs of these shots are multiplied by a discount factor. In an embodiment, the weights are 0.8 for blank shots and 0.995 for dissolve shots. In an embodiment, there are penalties for long and short shots.

In an embodiment, to optimize scene segmentation, dynamic programming is used to compute the cost of all possible cuts through the graph. In an embodiment, Dijkstra's algorithm is used to optimize the cuts of the graph. After the graph is optimally cut using a minimum cut algorithm, each sub-graph is identified as a scene 720.

In at least some embodiments, an input video can be additionally processed to annotate one or more of the detected scenes with useful and interesting information. In an embodiment, face detection is used to determine whether a face appears in a detected scene and facial recognition can be used to identify the detected face, such as an actor (or actress) within the detected scene. The scene can be associated with the actor or actress, and users can search by the actor's name to navigate to the detected scene. Further, the metadata may enable users to navigate to a website or web application to learn more about the actor or actress.

In an embodiment, music recognition software can be used to identify the title of a song or other music playing in a scene when it is determined that the scene includes music. In addition to associating the song or music with the scene, the metadata can also enable a user to purchase the song or music.

In an embodiment, a scene can be associated with textual data corresponding to the scene. For instance, an image/object detection and/or text recognition service can be used to detect images/objects (e.g., city skylines, monuments), text (e.g., license plates, location text overlays, street signs), and/or other data associated with the scene to determine a location corresponding to the scene. The scene can be associated with metadata about the images, objects and/or location. In some embodiments, trivia or other information relating to an actor appearing in a scene, music playing in the scene, or a location corresponding to the scene can be associated with the scene to provide a user with a more interactive film-viewing experience. Further, speech-to-text translation, closed captioning, subtitles, screenplays, and other textual data can be associated with the scene to enable users to search videos by keywords corresponding to the textual data.

In some embodiments, excerpts or summaries of a video can be generated based on segmented scenes and/or metadata associated with the scenes. For example, a video may capture a sporting event, and a user can extract or excerpt only those scenes including an occurrence of a score or other action based on shot and/or scene classifications. As another example, a video summary or montage can be created by extracting only those scenes including a specified actor and/or specified music and/or set in a specified location. As yet another example, videos can be edited to remove or exclude nude scenes, adult language, extreme violence, and/or other material that may be objectionable to some viewers. It should be appreciated that alternate embodiments may have numerous variations from that described above.

Figure 7:
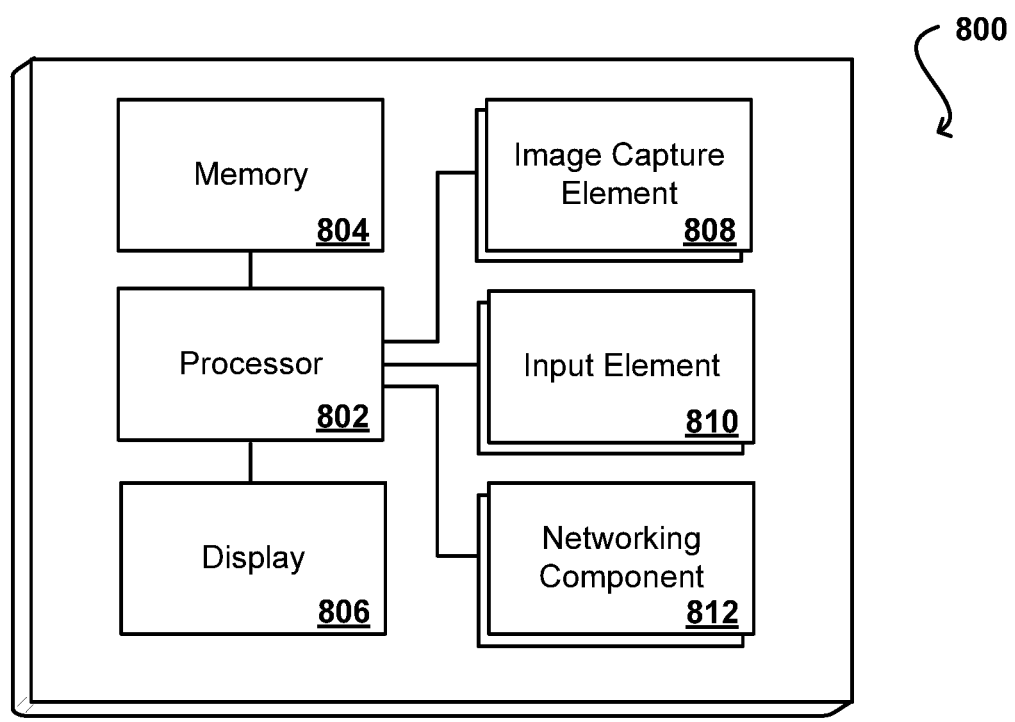
FIG. 7 illustrates an example computing device that can be used in accordance with various embodiments.

FIG. 7 illustrates a logical arrangement of a set of general components of an example computing device 800. In this example, the device includes a processor 802 for executing instructions that can be stored in a memory component 804. As would be apparent to one of ordinary skill in the art, the memory component can include many types of memory, data storage, or non-transitory computer-readable storage media, such as a first data storage for program instructions for execution by the processor 802, a separate storage for images or data, a removable memory for sharing information with other devices, etc. The device typically will include some type of display element 806, such as a touchscreen, electronic ink (e-ink), organic light emitting diode (OLED), liquid crystal display (LCD), etc., although devices such as portable media players might convey information via other means, such as through audio speakers. In at least some embodiments, the display screen provides for touch or swipe-based input using, for example, capacitive or resistive touch technology. The device in many embodiments will include one or more cameras or image sensors 808 for capturing image or video content. A camera can include, or be based at least in part upon any appropriate technology, such as a CCD or CMOS image sensor having a sufficient resolution, focal range, viewable area, to capture an image of the user when the user is operating the device. An image sensor can include a camera or infrared sensor that is able to image projected images or other objects in the vicinity of the device. Methods for capturing images or video using a camera with a computing device are well known in the art and will not be discussed herein in detail. It should be understood that image capture can be performed using a single image, multiple images, periodic imaging, continuous image capturing, image streaming, etc.

Further, a device can include the ability to start and/or stop image capture, such as when receiving a command from a user, application, or other device. The example device can include at least one audio component 810, such as a mono or stereo microphone or microphone array, operable to capture audio information from at least one primary direction. A microphone can be a uni- or omni-directional microphone as known for such devices. In some embodiments, a computing device can alternatively or additionally include other input elements to receive conventional input from a user. This conventional input can include, for example, a push button, touch pad, touchscreen, wheel, joystick, keyboard, mouse, keypad, or any other such component or element whereby a user can input a command to the device. In some embodiments, however, such a device might not include any buttons at all, and might be controlled only through a combination of visual and audio commands, such that a user can control the device without having to be in contact with the device.

The computing device can also include one or more communication elements or networking sub-systems 812, such as a Wi-Fi, Bluetooth, RF, wired, or wireless communication system. The device in many embodiments can communicate with a network, such as the Internet, and may be able to communicate with other such devices.

Figure 8:
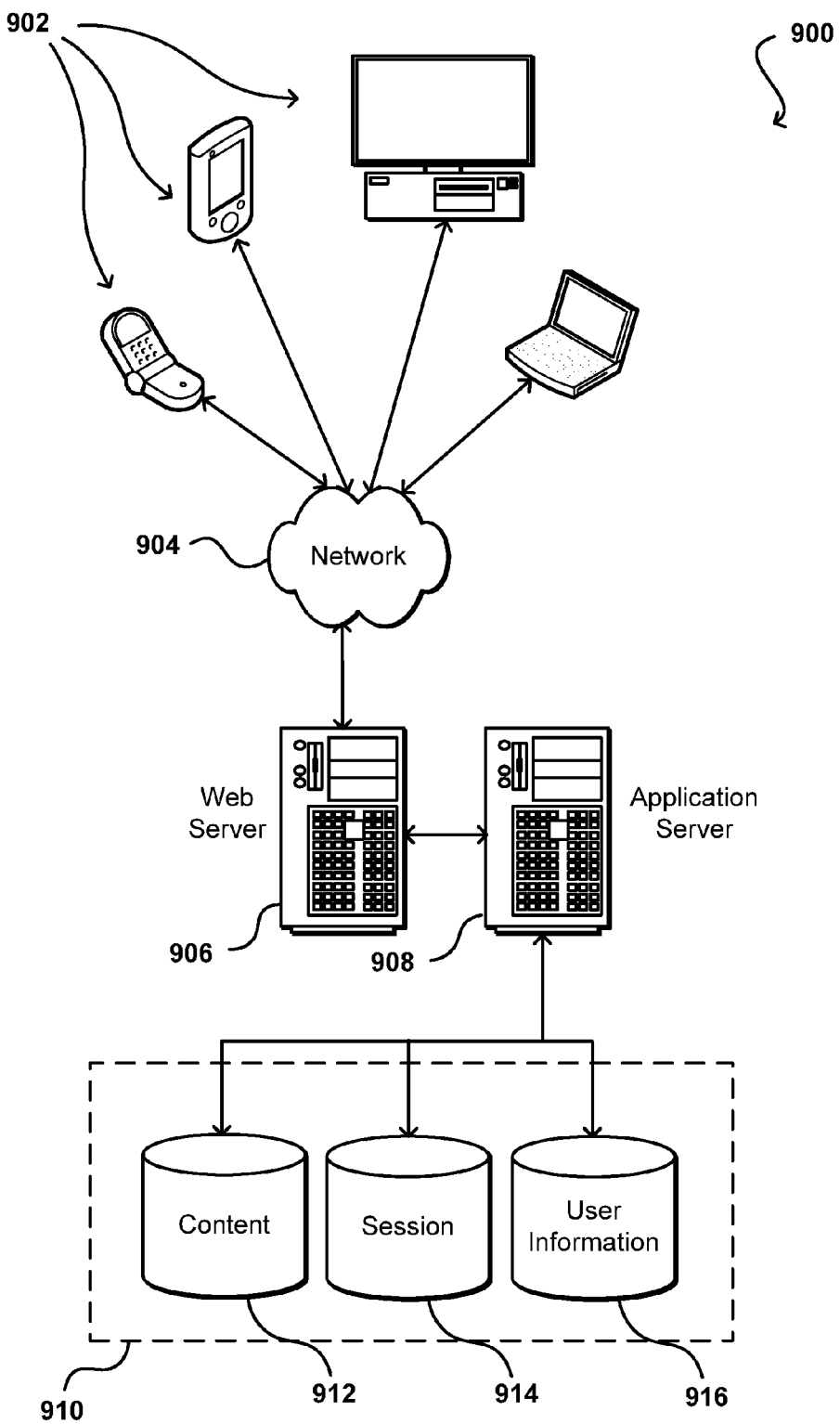
FIG. 8 illustrates an environment in which various embodiments can be implemented.

As discussed, different approaches can be implemented in various environments in accordance with the described embodiments. For example, FIG. 8 illustrates an example of an environment 900 for implementing aspects in accordance with various embodiments. As will be appreciated, although a Web-based environment is used for purposes of explanation, different environments may be used, as appropriate, to implement various embodiments. The system includes an electronic client device 902, which can include any appropriate device operable to send and receive requests, messages or information over an appropriate network 904 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 906 for receiving requests and serving content in response thereto, although for other networks, an alternative device serving a similar purpose could be used, as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 908 can include any appropriate hardware and software for integrating with the data store 910 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 906 in the form of HTML, XML or another appropriate structured language in this example. The handling of all requests and responses, as well as the delivery of content between the client device 902 and the application server 908, can be handled by the Web server 906. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing content (e.g., production data) 912 and user information 916, which can be used to serve content for the production side. The data store is also shown to include a mechanism for storing log or session data 914. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 902. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 900 in FIG. 8 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
    determining a feature for a frame of a plurality of frames of a video;
    analyzing a similarity between the feature and at least one feature associated with adjacent frames to the frame to determine a first shot of the video;
    determining that the first shot meets a time threshold;
    determining that a similarity metric between a first frame of the first shot and a second frame of the first shot meets a dissimilarity threshold;
    determining that a similarity matrix of at least a subset of frames of the first shot corresponds to a dissolve pattern, the subset of frames corresponding to at least one second shot of the video;
generating a graph of the video, the graph comprising nodes corresponding to the first shot and the at least one second shot; and
determining a grouping of the first shot and the at least one second shot by performing one or more cuts of the graphs.

2. The computer-implemented method of claim 1, wherein analyzing similarity between the respective features for adjacent frames further includes:
determining respective cosine similarity between the respective features for the adjacent frames; and
comparing the respective cosine similarity between the respective features for the adjacent frames to a similarity threshold.

3. The computer-implemented method of claim 1, wherein determining that the similarity matrix of at least the subset of frames of the first shot corresponds to the dissolve pattern further includes:
generating the dissolve pattern;
sliding the dissolve pattern along a diagonal of the similarity matrix; and
matching the dissolve pattern to at least one portion of the diagonal.

4. The computer-implemented method of claim 1, wherein determining the respective features for each frame further includes:
determining a first histogram for the frame;
determining a first plurality of histograms for first portions of the frame; and
determining a second plurality of histograms for second portions of the frame.

5. The computer-implemented method of claim 1, wherein determining the grouping of the first shot and the at least one second shot includes:
obtaining one or more respective key frames for the first shot and the at least one second shot, wherein the nodes of the graph correspond to the respective key frames.

6. The computer-implemented method of claim 5, wherein edges of the graph correspond to a respective cost between the nodes, and wherein the respective cost is based on a function of time and visual similarity.

7. The computer-implemented method of claim 1, further comprising:
obtaining one of an audio feature corresponding to the video or a text feature corresponding to the video, wherein the grouping is further based at least in part on one of the audio feature or video feature.

8. The computer-implemented method of claim 1, further comprising:
detecting a face in the grouping;
determining an identity of the face; and
associating the identity with the grouping.

9. The computer-implemented method of claim 1, further comprising:
detecting one of textual data corresponding to the grouping or music in the grouping, the music associated with a title; and
associating one of the textual data or the title with the grouping.

10. The computer-implemented method of claim 1, further comprising:
analyzing visual content of the first shot; and
classifying the first shot as one of a dissolve shot, a blank shot, a card credit, a rolling credit, an action shot, or a static shot.

11. A non-transitory computer-readable storage medium comprising instructions that, upon being executed by a processor of a computing device, cause the computing device to:
determine a feature for a frame of a plurality of frames of a video;
analyze a similarity between the feature and at least one feature associated with adjacent frames to the frame to determine a first shot of the video;
determine that the first shot meets a time threshold;
determine that a similarity metric between a first frame of the first shot and a second frame of the first shot meets a dissimilarity threshold;
determine that a similarity matrix of at least a subset of frames of the first shot corresponds to a dissolve pattern, the subset of frames corresponding to at least one second shot of the video;
generate a graph of the video, the graph comprising nodes corresponding to the first shot and the at least one second shot; and
determine a grouping of the first shot and the at least one second shot by performing one or more cuts of the graphs.

12. The non-transitory computer-readable storage medium of claim 11, wherein the instructions, upon being executed, further cause the computing device to:
associate metadata with the grouping; and
enable a user to navigate to the grouping based on the metadata.

13. The non-transitory computer-readable storage medium of claim 12, wherein the metadata corresponds to at least one of an identity of an actor appearing in the at least one grouping, title of music playing in the at least one grouping, a representation of an object in the at least one grouping, a location corresponding to the at least one grouping, or textual data corresponding to the at least one grouping.

14. The non-transitory computer-readable storage medium of claim 11, wherein the instructions, upon being executed to determine that the similarity matrix of at least the subset of frames of the first shot corresponds to the dissolve pattern, further cause the computing device to:
generate the dissolve pattern;
slide the dissolve pattern along a diagonal of the similarity matrix; and
match the dissolve pattern to at least one portion of the diagonal.

15. The non-transitory computer-readable storage medium of claim 11, wherein the instructions, upon being executed to analyze similarity between the respective features for adjacent frames, further cause the computing device to:
determine respective cosine similarity between the respective features for the adjacent frames; and
compare the respective cosine similarity between the respective features for the adjacent frames to a similarity threshold.

16. A computing device, comprising:
a processor;
memory including instructions that, upon being executed by the processor, cause the computing device to:
determine a feature for a frame of a plurality of frames of a video;
analyze a similarity between the feature and at least one feature associated with adjacent frames to the frame to determine a first shot of the video;
determine that the first shot meets a time threshold;

determine that a similarity metric between a first frame of the first shot and a second frame of the first shot meets a dissimilarity threshold;

determine that a similarity matrix of at least a subset of frames of the first shot corresponds to a dissolve pattern, the subset of frames corresponding to at least one second shot of the video;

generate a graph of the video, the graph comprising nodes corresponding to the first shot and the at least one second shot; and determine a grouping of the first shot and the at least one second shot by performing one or more cuts of the graphs.

17. The computing device of claim 16, wherein the instructions, upon being executed include causing the computing device to:

determine respective cosine similarity between the respective features for the adjacent frames; and compare the respective cosine similarity between the respective features for the adjacent frames to a similarity threshold.

18. The computing device of claim 16, wherein the instructions, upon being executed to determine that a similarity matrix of at least the subset of frames of the first shot corresponds to the dissolve pattern include causing the computing device to:

generate the dissolve pattern;

slide the dissolve pattern along a diagonal of the similarity matrix; and match the dissolve pattern to at least one portion of the diagonal.

19. The computing device of claim 16, wherein the instructions, upon being executed to determine the respective features for each frame include causing the computing device to:

determine a first histogram for the frame;

determine a first plurality of histograms for first portions of the frame; and determine a second plurality of histograms for second portions of the frame.

20. The computing device of claim 16, wherein the instructions, upon being executed to determine the grouping of the first shot and the at least one second shot include causing the computing device to:

obtain one or more respective key frames for the first shot and the at least one second shot, wherein the nodes of the graph correspond to the respective key frames, wherein edges of the graph correspond to a respective cost between the nodes, and wherein the respective cost is based on a function of time and visual similarity.

* * * * *